Inventor:
Leslie L. Baird,
by Albert S. Richardson Jr.
Attorney.

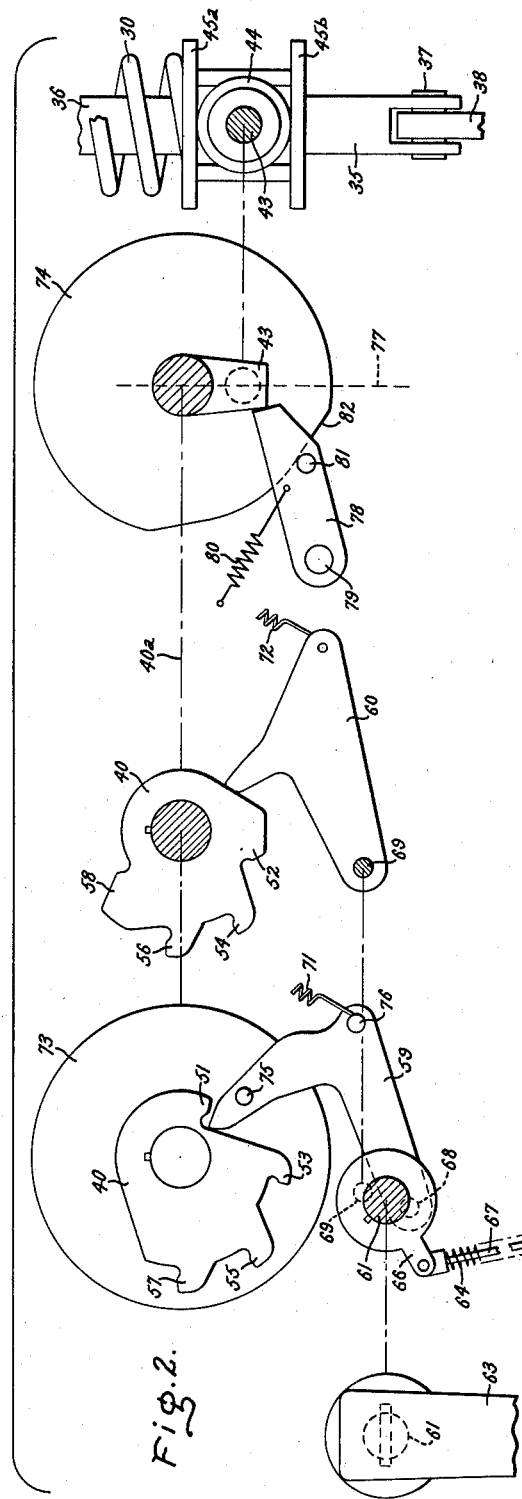
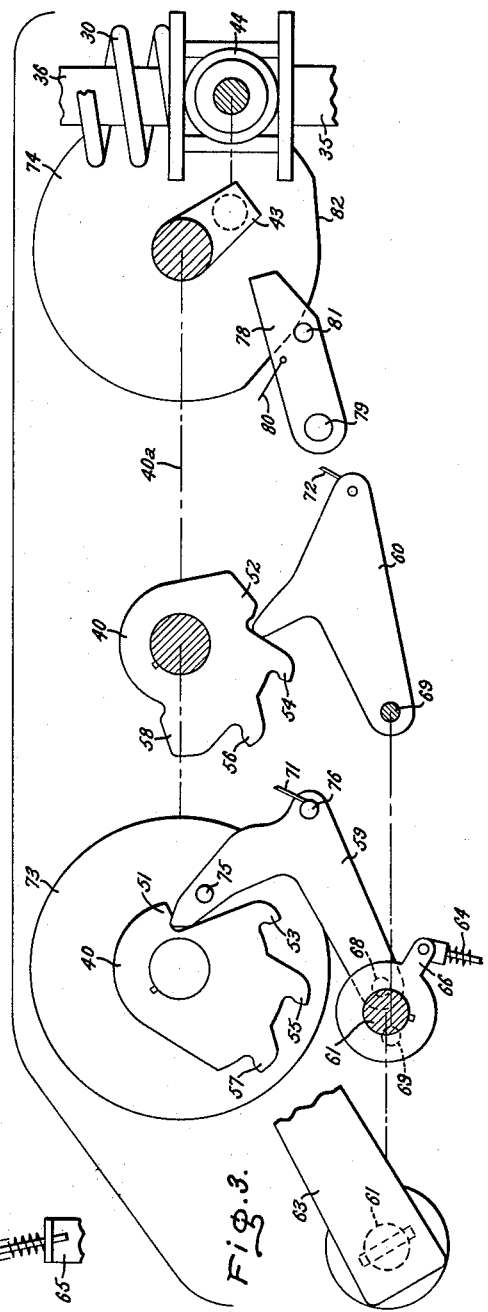
Fig.2.
Fig.3.
Inventor:
Leslie L. Baird,
by Albert S. Richardson Jr.
Attorney.

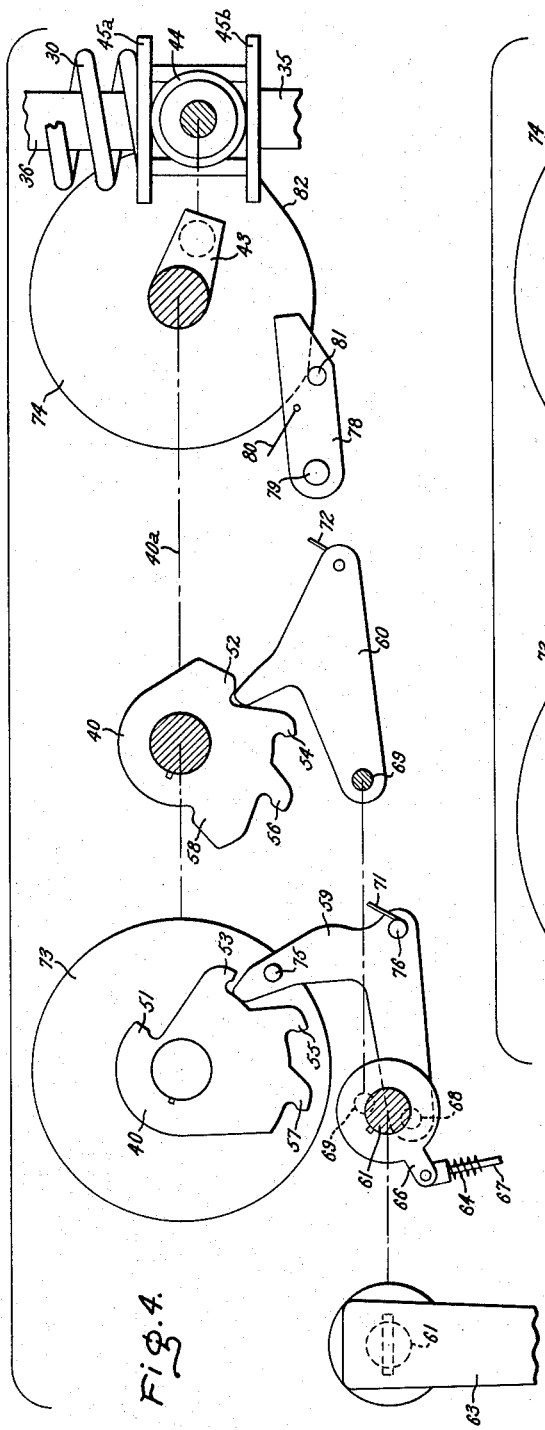

United States Patent Office 3,095,489
Patented June 25, 1963

3,095,489
MANUAL CHARGING MEANS FOR STORED ENERGY CLOSING MECHANISMS OF ELECTRIC CIRCUIT BREAKERS
Leslie L. Baird, Swarthmore, Pa., assignor to General Electric Company, a corporation of New York
Filed Oct. 20, 1960, Ser. No. 63,802
10 Claims. (Cl. 200—153)

This invention relates to means for manually charging the stored energy closing mechanism of an electric circuit breaker, and more particularly it relates to a device for manually loading a spring utilized in a circuit breaker to provide breaker closing energy.

In recent years the utilization of stored energy closing mechanisms in relatively large, heavy-duty electric circuit breakers has become an increasingly more common practice among circuit breaker manufacturers. In order to obtain the high-speed and positive closing action essential for successful operation of such breakers, while at the same time satisfying predetermined space limitation, powerful closing springs must be used. The relatively great amount of closing energy which is released by such springs each time the breaker is closed must first be accumulated or stored in the springs by the operation of suitable charging means, and it is with such charging means that the present invention is concerned.

It has previously been proposed to accomplish the spring charging operation in circuit breakers by means of electroresponsive devices. For example, in Patent 2,667,076, Favre issued on January 26, 1954, there is disclosed and claimed a motor and planetary gear reduction unit for automatically charging a powerful closing spring. While such an arrangement is advantageous from the viewpoint of performing a great deal of work in a relatively small amount of space with negligible manual effort, it is a relatively expensive solution to the problem of charging breaker closing springs. On the other hand, conventional manual means for stressing or charging springs, insofar as I am now aware, do not satisfactorily meet the present needs for a relatively compact and easily operated device capable of charging powerful closing springs in heavy-duty circuit breakers. Accordingly, a general object of my invention is the provision, for an electric circuit breaker equipped with a stored energy closing mechanism, of an improved manual charging means which is compact in design, economical to build, and which may be manually operated with relative ease to charge a powerful closing spring.

It is a further object of my invention to provide a conveniently operable manual charging device capable of quickly accomplishing the charging of powerful closing springs.

Another object of the invention is the provision of improved spring charging means the operation of which may be carried out manually with the exertion of only a reasonable amount of force which does not increase in proportion to the increase in spring force as the spring becomes charged.

A more specific object of my invention is the provision of a double-pawl ratchet mechanism for use in conjunction with the charging and closing of a circuit breaker equipped with stored energy actuating means.

In carrying out my invention in one form, I provide a double-pawl ratchet mechanism including a rotatable ratchet member the rotation of which stresses a powerful spring which provides closing energy for an electric circuit breaker. In order to rotate the ratchet member and hence charge the spring, the mechanism is provided with a pair of reciprocating pawls which are alternately operated by an oscillatory handle to effect step-by-step advancement of the rotatable member. The operating handle is disposed for movement in a plane which is perpendicular to the plane of movement of the circuit breaker switch contacts, and by manually pumping the handle an operator can conveniently and quickly charge the closing spring. In one aspect of my invention a special operating characteristic of the ratchet mechanism is obtained by so designing the mechanism that the manual force needed to effect pumping motion of the operating handle remains relatively uniform throughout the charging operation, even though the spring force increases materially.

My invention will be better understood and its various objects and advantages will be more fully appreciated from the following description taken in conjunction with the accompanying drawings in which:

FIGS. 2, 3 and 4 are a series of enlarged and exploded front views of the charging means of FIG. 1 showing, respectively, the ratchet wheel of the charging means in three different angular positions corresponding to early steps in the charging operation; and FIG. 5 is a partially exploded front view of a ratchet wheel constructed in accordance with another embodiment of my invention.

Figure 1:
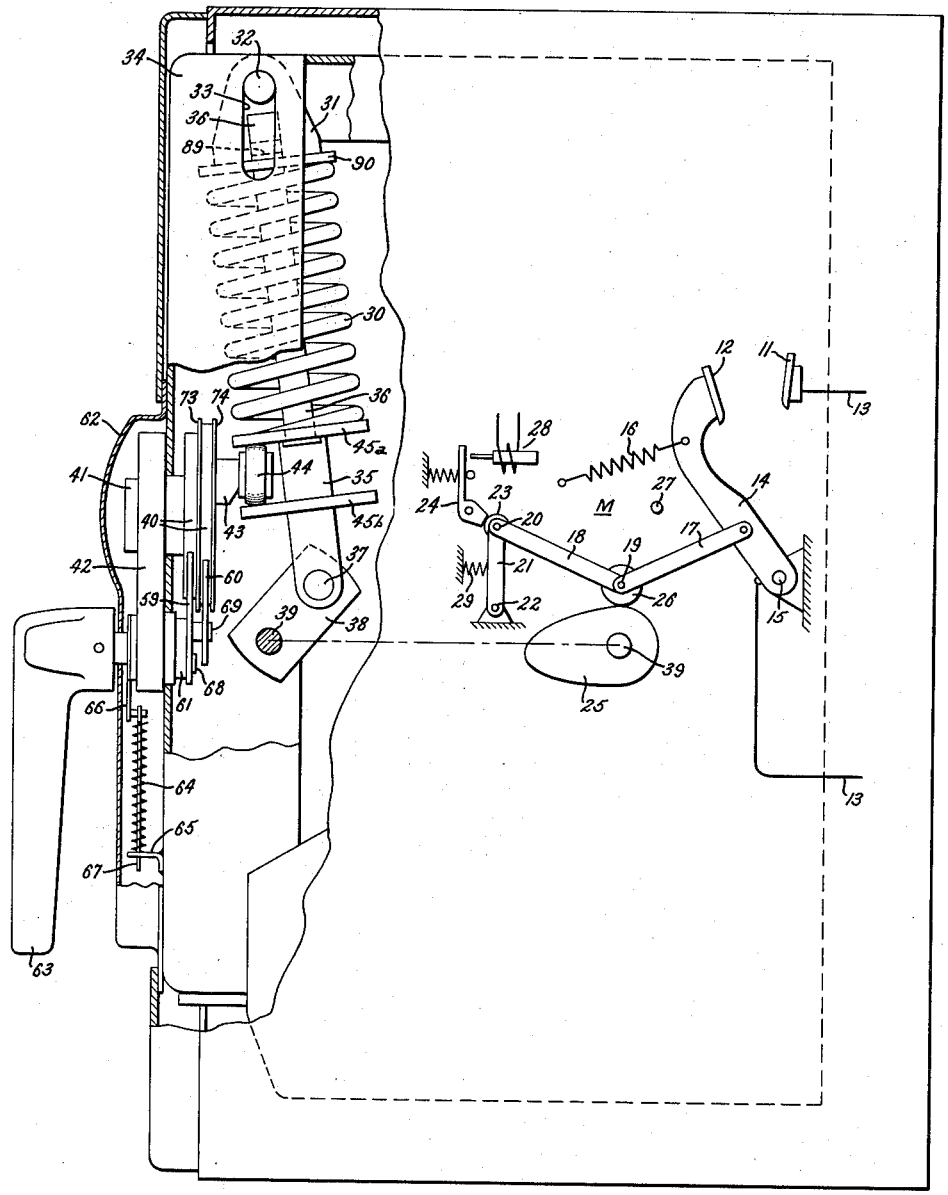
FIG. 1 is a side elevation of a circuit breaker equipped with a stored energy closing mechanism and a manually operable charging means for the closing mechanism, the charging means being constructed in accordance with a preferred embodiment of my invention.

Referring now to FIG. 1, the schematically illustrated electric circuit breaker is seen to include a pair of separable switch contacts 11 and 12 connected in a circuit 13 in order to open and close that circuit. One switch contact 12 is carried by a movable switch arm 14 between an open circuit position, in which it is shown in FIG. 1, and a closed circuit position in which it is engaged by the other switch contact 11. The movable switch arm 14 is pivotally supported at 15 and is biased by a suitable opening spring 16 to an "open" position corresponding to the open circuit position of the switch contact 12.

For actuating the switch arm 14, and hence moving the switch contact 12 to its closed circuit position, I have shown in FIG. 1 a conventional trip-free operating mechanism comprising a pair of toggle links 17 and 18 pivotally joined together at a knee 19. One toggle link 17 is pivotally connected to the movable switch arm 14, whereas the other toggle link 18 is connected by pivot pin 20 to the upper end of a guide link 21. The guide link 21 is pivotally supported at its lower end by a fixed fulcrum 22. The pivot pin 20 carries a latch roller 23 which cooperates with a suitable trip latch 24.

So long as the trip latch 24 remains in the latched position shown, the toggle 17, 18 is capable of transmitting thrust to the movable switch arm 14. Thus, when its knee 19 is lifted from the position shown in FIG. 1, the toggle 17, 18 is extended thereby driving the switch contact 12 toward its closed circuit position. This lifting of the toggle knee is accomplished by the action of a rotatable cam 25 operatively coupled to a roller 26 which is mounted on the knee 19. Preferably, the closing cam 25 is arranged to drive the toggle slightly overcenter and against a stop 27 so that the switch contact 12 will be held in closed circuit position even when the cam is returned to its original position shown in FIG. 1.

Should the latch 24 be tripped when the breaker is closed, or even during the closing operation, the toggle 17, 18 will be rendered inoperative to transmit thrust to the movable switch arm 14. As a result, the opening spring 16 impels the switch contact 12 to its open circuit position. As long as the latch 24 is held tripped, the toggle 17, 18 will remain inoperative to transmit closing thrust to the movable switch arm 14. The latch may be tripped by any suitable means, as, for example, by energizing the winding of the solenoid 28 illustrated in FIG. 1. A suitable resetting spring 29 cooperates with the guide link 21 to reset the mechanism to the latched position after it has been tripped.

In order to rotate the closing cam 25 so as to actuate the switch arm 14 and drive the contact 12 to its closed circuit position, a stored energy closing device is provided. As is seen in FIG. 1, this device comprises a heavy compression spring 30 suitably supported at its upper end by a pivotally mounted bracket 31. Each end of a pin 32 transversely extending from opposite sides of the bracket 31 is disposed in a vertically elongated slot 33 located in a rigid frame member 34 of the circuit breaker. The lower end of the spring 30 is supported by an arcuately movable spring retaining member 35, and a rod 36 extending vertically through the spring 30 is affixed to the upper portion of member 35. The spring retaining member 35 is pinned at 37 to a crankarm 38 which in turn is keyed to a rotatable load operating shaft 39 suitably journaled to the frame member 34 of the breaker. The previously mentioned closing cam 25 is also keyed to shaft 39.

In FIG. 1 the spring 30 is shown in a compressed state. In other words, the spring, as shown in FIG. 1, is fully charged and breaker closing energy is stored therein. Upon release of the closing energy (which occurs in a manner described hereinafter) the spring force drives the spring retaining member 35 downwardly in an arcuate path thereby rotating the load operating shaft 39 in a clockwise direction, as viewed in FIG. 1. This produces rotation of the closing cam 25 of the mechanism in a manner to actuate the switch arm 14, whereby a high speed and forcible closing operation of the circuit breaker is obtained.

In order to charge manually the closing spring 30 of the stored-energy closing device, a double-pawl ratchet mechanism is provided. The ratchet mechanism includes a rotatable ratchet member, to be referred to hereinafter as the ratchet wheel, and this member is identified generally by the reference number 40 in the drawings. The ratchet wheel is supported by a sleeve bearing 41 or the like for 360 degrees rotation about its axis 40a. The sleeve bearing is housed in a stationary mounting block 42 which, as is shown in FIG. 1, is secured to the front of the circuit breaker frame member 34. Projecting rearwardly from the ratchet wheel 40 is an eccentric output element 43 which is connected to the spring retaining member 35 of the stored-energy closing device by means including a self-aligning bearing 44 having a spherical camming surface. The bearing 44 is attached to the output element 43 and is snugly disposed between a pair of spaced, horizontally oriented plates 45a and 45b of the spring retaining member 35.

As is indicated most clearly by FIGS. 1 and 2, the output element 43 moves orbitally, upon rotation of the ratchet wheel 40, in a plane which intersects at substantially a right angle the plane of arcuate movement of the spring retaining member 35. The spherical camming surface of bearing 44 in cooperation with the flat surfaces of plates 45a and 45b provide a low-friction joint particularly well suited for directly translating the orbital motion of the output element 43 into arcuate motion of member 35.

The closing spring 30, acting through its associated retaining member 35 and the eccentric output element 43 connected thereto, normally biases the ratchet wheel 40 to a first angular position in which it is shown in FIG. 2. Here the output element 43 is at the lowest point in its orbit, and the spring 30 is in a relatively extended state. The spring will be stressed and closing energy is accumulated therein upon rotation of the ratchet wheel 40 to a predetermined second or top dead-center position wherein the output element 43, as shown in FIG. 1, is at its apogee.

For the purpose of rotating the ratchet wheel 40, a plurality of peripheral teeth are formed therein. Preferably these teeth are arranged in two sets disposed in side-by-side relationship, each set comprising four teeth. In FIGS. 2–4 the successive teeth of one set are identified by the reference numbers 51, 53, 55 and 57, respectively, and the successive teeth of the other set are identified by the reference numbers 52, 54, 56 and 58, respectively. The peripheral teeth 51—58 are sequentially engaged for effecting step-by-step advancement of the ratchet wheel 40 from its first position (FIG. 2) to its second or top dead-center position (FIG. 1) by a pair of reciprocating pawls 59 or 60 operated alternately by a pivotally supported oscillatory member 61. The pawls and teeth are so arranged that the ratchet wheel 40 is angularly advanced in a counterclockwise direction as viewed in FIGS. 2–4.

The oscillatory operating member 61 comprises a horizontally oriented shaft suitably journaled in the mounting block 42 and terminated at its forward end, in front of the circuit breaker escutcheon 62, by a conveniently accessible "pistol grip" handle 63. The handle 63, which moves in a plane substantially perpendicular to the plane of movement of the circuit breaker switch arm 14, is designed for manual operation between a first or lowered position (FIGS. 1, 2 and 4) and a second or raised position (FIG. 3) located about 120 angular degrees in a counterclockwise direction from the first position.

The operating member 61 has associated therewith suitable bias means for urging this member in a counterclockwise direction, as viewed from the front of the circuit breaker, when the handle 63 is in its raised position (FIG. 3) and alternatively for urging the member 61 in a clockwise direction when the handle 63 is in its lowered position (FIG. 2). Preferably the bias means comprises a compression spring 64 disposed between a stationary bracket 65 mounted on the breaker frame and a radially projecting element 66 keyed to shaft 61. A rod-like spring guide 67 is pinned at one end to the projection 66 and slides freely at its other end in a cooperating slot located in the bracket 65. With this arrangement a toggle-action bias is obtained, whereby the spring 64 is able yieldably to oppose counterclockwise movement of the operating handle 63 away from its lowered position and also to oppose clockwise movement of the handle 63 away from its raised position. The purpose of this two-way bias will become apparent when the operation of the FIG. 5 embodiment of the ratchet mechanism is described hereinafter.

The rear end of the operating handle shaft 61 is provided with two eccentric portions 68 and 69 disposed on opposite sides of the shaft axis, and the pawls 59 and 60 of the ratchet mechanism are pivotally mounted on these eccentrics 68 and 69, respectively. As is clearly shown in FIGS. 2–4, the eccentrics are so disposed on shaft 61 that counterclockwise movement of the operating handle 63, while carrying pawl 60 to the left and downward, will cause the pawl 59 to move to the right and upwardly thereby partially rotating the ratchet wheel 40, whereas the reverse or clockwise movement of the operating handle 63, while carrying pawl 59 to the right and downward, will cause the pawl 60 to move to the left and upward thereby further rotating the ratchet wheel 40. Thus the pawl 59 is moved to effect angular advancement of the wheel 40 by alternate strokes of the operating handle (upstrokes), and the pawl 60 is moved to effect similar advancement of the wheel by intermediate strokes of the handle (downstrokes).

Pawl 59 is biased into driving engagement with one set of peripheral ratchet teeth (51, 53, 55 and 57) by means of an appropriate tension spring 71 connected thereto, while pawl 60 is biased into driving engagement with the other set of peripheral ratchet teeth (52, 54, 56 and 58) by means of another tension spring 72. The wheel-driving end of pawl 60 is disposed in an annular track defined by two spaced-apart disc-like guide members on plates 73 and 74 disposed at opposite sides of the associated set of peripheral teeth. The guide members 73 and 74 are each affixed to the ratchet wheel by appropriate means such as rivets (not shown), and they serve to limit sidewise movement of pawl 60 so that this driving pawl will not slip off the periphery of the ratchet wheel 40 during operation of the mechanism.

Sidewise movement of driving pawl 59 is limited in a like manner by the guide member 73 in cooperation with the part of the breaker frame disposed immediately in front of the ratchet wheel. Since the space between member 73 and the breaker frame is more than twice the width of the pawl 59, suitable spacers, such as the illustrated rivets 75 and 76 with protruding heads, have been attached to pawl 59. In this manner the pawl 59 is prevented from slipping off the one set of peripheral teeth (51, 53, 55 and 57) which it engages during operation of the ratchet mechanism.

It will be observed in FIGS. 2–4 that the peripheral teeth 51—58 on the ratchet wheel 40 are not uniformly spaced from the axis 40a of wheel rotation. By disposing the teeth at a plurality of different predetermined distances from the axis of rotation, as is done in the preferred embodiments of my invention, the special ratchet mechanism operating characteristic of my invention is realized. This special operating characteristic and the illustrated manner in which it is obtained will now be explained in detail.

It will be apparent to those skilled in the art that the force required to stress the closing spring 30 of the circuit breaker during a spring charging operation increases linearly in accordance with the amount of spring compression. In other words, the force exerted by the spring 30 on the spring retaining member 35, which member is lifted from its lowest position (FIG. 2) in order to compress the spring, increases directly in proportion to the distance which the spring has been shortened or deflected. In the illustrated embodiments of my invention it is the orbital movement of the eccentric output element 43 of the ratchet wheel 40 that lifts the spring retaining member 35 thereby charging the closing spring. Accordingly, it is apparent that during the charging operation the output element 43 experiences a downwardly directed force which increases substantially linearly in accordance with its vertical displacement, that is in accordance with the vertical component of movement of element 43 as measured from its initial position shown in FIG. 2. This relationship can also be expressed in terms of the angular advancement of the ratchet wheel 40: the spring force which bears on the element 43 is a constant-minus-cosine function of the angular position of the ratchet wheel measured with respect to its initial or first position (FIG. 2).

The downwardly directed force acting on the spherical bearing 44 of element 43 during the spring charging operation produces a torque in the ratchet wheel 40 opposing its counterclockwise advancement. The magnitude of this torque is, of course, the product of the magnitude of the force and the length of its moment arm. The line of action of the spring force on element 43 is nearly vertical, as viewed in the drawings, and in the illustrated embodiment of my invention the moment arm changes in accordance with the horizontal displacement of the element 43 from the vertical reference line 77 shown in FIG. 2. Thus, the moment arm of the spring force applied to the element 43 is a sine function of the angular position of the ratchet wheel 40. The spring-produced torque, which is opposing counterclockwise rotation of the ratchet wheel during the charging operation, is consequently a complex function of the angular advancement of the wheel 40, the maximum spring-produced torque being realized when the wheel has been rotated from its initial position to an angular position approximately 120 degrees therefrom.

Rotation of the ratchet wheel 40, for the purpose of charging the breaker closing mechanism, is accomplished by manual operation of the oscillatory handle 63. Through the action of the reciprocating pawls 59 and 60 in cooperation with the eight peripheral teeth 51—58, the operation of handle 63 produces sufficient counterclockwise driving torque in wheel 40 to overcome the spring-produced torque discussed above, whereby the closing spring 30 is compressed and breaker closing energy is stored therein. Although the spring force increases and the driving torque required to rotate the ratchet wheel varies as the wheel advances, for reasons just explained, the ratchet mechanism is designed in accordance with my invention so that the force needed to operate the handle 63 does not correspondingly vary during the charging operation. More specifically, the increasing force characteristic of the closing spring 30, as it is incrementally stressed in response to step-by-step rotation of the ratchet wheel, is so compensated by the mechanism construction that repeated oscillations of the operating handle 63 can be effected with the application of a relatively uniform amount of force. As a result of this "leveling" characteristic of the ratchet mechanism, the breaker closing mechanism can be manually charged with relative ease and dispatch by an operator exerting only a reasonable amount of force to effect each stroke of the handle 63.

In the preferred embodiments of my invention, the relatively-uniform-manual-force operating characteristic of the ratchet mechanism is obtained by appropriately selecting the different predetermined distances at which the various peripheral teeth 51—58 are respectively spaced from the axis of the ratchet wheel 40. The pawls 59 and 60 which sequentially engage the peripheral teeth are thus given variable lever arms, with respect to axis 40a, and the mechanical advantage of the pawl-and-tooth driving means for the ratchet wheel 40 is changed in accordance with the angular position of the wheel. In practice, the peripheral teeth can best be located on the ratchet wheel by graphical methods within the mechanical skill of the art, it being understood that ideally the lever arms of the pawls 59 and 60, as they engage successive teeth 51—58, should vary in the same relationship to the angular position of the wheel as the spring-produced torque varies. As a result of this construction, variations in the manual force needed to effect successive upstrokes and downstrokes of the operating handle 63 during the charging operation are minor compared to the relative increase in the force being exerted by the closing spring 30.

Additional ease of operation of the manually operable ratchet mechanism has been realized by so designing the mechanism that less force is required to effect an upstroke of the operating handle 63 than is required to effect the preceding downstroke. This desirable result is obtainable in the illustrated embodiments of my invention by appropriately selecting the spacings, from the axis 40a, of the ratchet teeth 53, 55 and 57 in relation to the teeth 52, 54 and 56, respectively.

From the foregoing detailed description of the structure and arrangement of the illustrated ratchet mechanism, its mode of operation may now be readily followed. In FIG. 2 the mechanism is shown in its initial position with the closing spring 30 discharged, and the operating handle 63 is in a vertical position as shown. An operator performs the first step of the spring charging operation by twisting the handle 63 in a counterclockwise direction through 120 degrees to its raised position. This upstroke of the operating handle causes pawl 59 to push against peripheral tooth 51 thereby driving the ratchet wheel 40 in a counterclockwise direction through an angle of about thirty degrees to the position in which it is shown in FIG. 3. The resulting movement of the eccentric output element 43 lifts the spring retaining member 35 to begin the compression of the closing spring 30.

The second step in the spring charging operation is performed by returning the operating handle 63 to its initial vertical position. This downstroke causes the operating shaft 61 to rotate in a clockwise direction, and pawl 60 coacting with the peripheral tooth 52 drives the ratchet wheel 40 further in the counterclockwise direction to the position in which it is shown in FIG. 4. At the same time the pawl 59 is pulled into a position in which it engages the next peripheral tooth 53. The closing spring 30 is further compressed as a result of the upward movement of the output element 43 during the second step of the operation.

To perform the third step of the spring charging operation, the operating handle 63 is again twisted in a counterclockwise direction to its raised position, whereby pawl 59, acting this time on peripheral tooth 53, propels the ratchet wheel 40 through an additional counterclockwise angle and the spring is further compressed. This action is accompanied by the resetting of pawl 60 into engagement with the next peripheral tooth 54. Upon returning the operating handle to its initial position during the fourth step of the operation, pawl 60, acting through tooth 54, drives the wheel further in the counterclockwise direction, and still more energy is stored in the closing spring.

The fifth and sixth steps of the spring charging operation are accomplished by again oscillating the operating handle 63, whereupon first the pawl 59 in cooperation with peripheral tooth 55, and then the pawl 60 in cooperation with peripheral tooth 56, operate to further advance the ratchet wheel 40 and incrementally stress the closing spring. The seventh step of the charging operation is an upstroke of the handle 63 which results in the operation of pawl 59, in cooperation with peripheral tooth 57, to drive the ratchet wheel 40 further in the counterclockwise direction. The closing spring 30 is now almost fully charged.

The eighth and final step in the spring charging operation is a downstroke of the operating handle 63. Pawl 60 is now in driving engagement with peripheral tooth 58, and during this final stroke (but before its conclusion) the ratchet wheel is advanced to a position 180 degrees from its initial position, this position being the top dead-center position of the ratchet wheel. The closing spring 30 is now fully charged.

The illustrated mechanism is designed so that the ratchet wheel is actually driven beyond its top dead-center position during the final downstroke of the operating handle 63, and as a result the spring retaining member 35 is able to reverse its movement and the closing spring 30 is free to release the energy which had been stored during the charging operation. In other words, once the ratchet wheel has been rotated by operation of the reciprocating pawls 59 and 60 in a counterclockwise direction beyond its top dead-center position, the output element 43 is no longer able to restrain downward movement of the spring retaining member 35. The release of energy stored in spring 30 closes the circuit breaker through the operation of the connected load operating shaft 39 and the breaker closing mechanism described hereinbefore, and at the same time the ratchet wheel 40 is rotated further in the counterclockwise direction and returned to its first or initial position shown in FIG. 2.

The ratchet wheel 40, which is driven from the top dead-center position toward its first position in response to the release of closing spring energy, will experience overtravel because of the inertia of the moving parts. In other words, the ratchet wheel rotates in a counterclockwise direction beyond its initial position (FIG. 2) at the conclusion of a breaker closing operation. This results in a clockwise torque being applied to the ratchet wheel by the closing spring 30 acting through the spring retaining member 35 and the eccentric output element 43, and consequently the wheel 40 is driven backwards in a clockwise direction to its initial position. Again the inertia of the moving parts tends to cause overtravel, but such overtravel in the clockwise direction is prevented by blocking means which will now be described.

The blocking means of my invention preferably comprises a finger-like member 78 pivotally mounted at 79 and biased by a spring 80 so that its distal end tends to move into the orbital path of movement of the output element 43 of the ratchet wheel 40. The edge of the guide member 74, which is disposed adjacent to the blocking finger 78, is slidably engaged by a lateral projection 81 of the finger thereby to determine the position of the finger 78 as the ratchet wheel rotates. This construction is shown in FIGS. 2, 3 and 4. It is apparent that the finger 78 is so inclined with respect to the orbital path of element 43 that the ratchet wheel rotates without interference in a counterclockwise direction, while clockwise movement of the wheel from its initial position (FIG. 2) will be blocked by the abutting engagement between element 43 and the distal end of the blocking finger 78.

The function of the blocking means 78 is to stop clockwise movement of the ratchet wheel 40, which movement follows overtravel of the wheel at the conclusion of a breaker closing operation, when the wheel has attained its initial position. This protects pawl 59 and the first peripheral tooth 51 from damage which might occur if the abrupt interengagement of these members were used to stop such clockwise movement of the ratchet wheel. A portion 82 of the edge of the guide member 74 is so relieved that the blocking finger 78 is held out of the orbital path of element 43 until after the leading edge of this element has passed beyond the distal end of the finger during the breaker closing operation, and in this manner I minimize misoperation of the blocking means caused by rebounding thereof.

In FIG. 5 I have illustrated a modified construction of the ratchet wheel 40. The FIG. 5 ratchet wheel differs from the ratchet wheel shown in FIGS. 2–4 in that an additional six peripheral teeth 83—88 have been formed therein. Three of these additional teeth 83, 85 and 87 are grouped with the odd-numbered set of peripheral teeth 51, 53, 55 and 57 for engagement by pawl 59, while the other three additional teeth 84, 86 and 88 are grouped with the even-numbered set of teeth 52, 54, 56 and 58 for engagement by pawl 60. The purpose of the extra ratchet teeth in the FIG. 5 embodiment of my invention is to enable the circuit breaker to be slowly closed in order to check the contact "wipe" adjustment or to facilitate field assembly of new switch contacts.

To utilize the slow-closing feature of my invention, the ratchet mechanism incorporating the FIG. 5 ratchet wheel is operated by pumping the operating handle 63 in the manner described hereinbefore. However, near the conclusion of a spring charging operation, and before the ratchet wheel is driven beyond its top dead-center position, the operator must pause to insert a removable pin (not shown) into a hole 89 located in the spring guide rod 36 at its upper end. As can be seen in FIG. 1, at this point the spring 30 is so compressed that the hole 89 in rod 36 has become exposed above an integral plate 90 of the springs supporting bracket 31. The pin inserted in hole 89 coacts with plate 90 and rod 36 to interconnect the upper bracket 31 and the lower spring retaining member 35 in a manner which prevents elongation of the closing spring 30. Hence the spring will not release any stored energy upon subsequent movement of the ratchet wheel 40 beyond its top dead-center position. The circuit breaker can now be slowly closed by continued pumping of the manual operating handle 63.

In response to the next three oscillations of the operating handle 63, the reciprocating pawls 59 and 60 sequentially engage the additional ratchet teeth 83—88 thereby advancing the ratchet wheel through approximately 180 degrees in a step-by-step manner. By this action the ratchet wheel is returned to its initial position, and its eccentric output element 43 forces the spring retaining member 35 downwardly to its lowest position. As a result, the load operating shaft 39 and hence the closing cam 25 are rotated in a clockwise direction, as viewed in FIG. 1, and the switch arm 14 is actuated by the circuit breaker operating mechanism to carry the movable switch contact 12 slowly to its closed circuit position. During this operation the entire closing spring assembly moves downwardly as a unit, with pin 32 of bracket 31 riding in the vertical slot 33 formed in the circuit breaker frame member 34.

During a regular maintenance or inspection routine an operator may stop the slow-closing operation before its conclusion, so as to inspect the partially closed switch contacts or the like, and then reopen the breaker by depressing a trip button (not shown) located on the breaker escutcheon 62. In the event that the operating handle 63 of the ratchet mechanism had been left in its raised position when the slow-closing operation was stopped, the bias spring 64 acting on shaft 61 will serve to hold the handle in this position and prevent its sudden return to its lowered, normal position upon subsequent tripping of the circuit breaker. This prevents possible injury to the hand of the operator when he depresses the trip button.

While I have shown and described preferred embodiments of my invention by way of illustration, other modifications will occur to those skilled in the art. I therefore contemplate by the claims which conclude this specification to cover all such modifications as fall within the true spirit and scope of my invention.

What I claim as new and desire to secure by United States Letters Patent is:

1. In an electric circuit breaker: a pair of separable switch contacts; first means for moving one of the switch contacts from an open circuit position to a closed circuit position; stored energy actuating means, including a spring; second means coupling the actuating means to said first means for operating the first means upon discharge of the spring; and charging means for stressing said spring, the charging means comprising a ratchet wheel connected to said spring so as to stress the spring upon predetermined rotation of the wheel, a pair of reciprocating pawls mounted in driving engagement with said wheel, said pawls being alternately operated to rotate the wheel in a step-by-step manner, and a manual operating handle mounted for oscillatory movement in a plane which is substantially perpendicular to the plane of movement of said one switch contact, said handle being connected to said pawls so as to operate both of them in turn during each oscillation of the handle.

2. In an electric circuit breaker: a pair of separable switch contacts; switch means for moving one of the switch contacts from an open circuit position to a closed circuit position; stored energy actuating means including a spring; means operatively coupling said spring to the switch arm; and charging means for causing the spring to accumulate energy, said charging means comprising a double-pawl ratchet mechanism manually operated by an oscillatory handle successive strokes of which incrementally stress the spring, said charging means having a variable mechanical advantage which changes upon operation of the ratchet mechanism to compensate for energy accumulation in the spring, whereby variations in the force needed to effect repeated oscillations of the handle during the charging operation are relatively minor.

3. In an electric circuit breaker: a pair of separable switch contacts; means comprising a movable switch arm for moving one of the switch contacts from an open circuit position to a closed circuit position; stored energy actuating means, including a spring, operatively coupled to the switch arm for moving said arm in response to discharge of the actuating means; and means comprising a ratchet mechanism for charging the stored energy actuating means, said ratchet mechanism including a ratchet wheel connected to said spring to stress the spring upon rotation of the wheel and a reciprocating pawl disposed to rotate the wheel upon operation thereof, said pawl being operated by an oscillatory handle alternate strokes of which move the pawl in a manner to effect step-by-step advancement of the wheel, said mechanism being constructed and arranged to have a variable mechanical advantage which is appropriately changed at predetermined steps of advancement of the wheel to enable each of said alternate strokes of the handle to be effected by the application of a force which is relatively uniform throughout the charging operation.

4. In an electric circuit breaker: a pair of separable switch contacts; means comprising a movable switch arm for moving one of the switch contacts from an open circuit position to a closed circuit position; stored energy actuating means, including a spring; means peratively coupling said actuating means to the switch arm; and means for charging the stored energy actuating means comprising a rotatable ratchet member connected to said spring so as to stress the spring upon rotation thereof, the ratchet member having at least two peripheral teeth spaced at different predetermined distances from its axis of rotation, a reciprocating pawl disposed to engage the teeth of the ratchet member, an oscillatory operating handle, and means pivotally connecting the pawl to the handle so that the pawl is moved to effect step-by-step angular advancement of the member by alternate strokes of the handle, said predetermined distances being selected so that the amount of force required to effect each of said alternate strokes of the handle is relatively uniform throughout the charging operation.

5. In an electric circuit breaker: a pair of separable switch contacts; means comprising a movable switch arm for moving one of the switch contacts from an open circuit position to a closed circuit position; stored energy actuating means, including a spring; means operatively coupling said actuating means to said switch arm for moving the switch arm upon discharge of the actuating means; and means comprising a ratchet mechanism for charging the stored energy actuating means, said ratchet mechanism including a ratchet wheel connected to said spring, said spring being stressed upon rotation of said wheel, first and second reciprocating pawls each of which is disposed to rotate the wheel upon operation thereof, an oscillatory operating handle connected to the pawls for operating the same, said wheel being partially rotated by the first pawl in response to movement of the handle in one direction and being further rotated by the second pawl in response to movement of the handle in a reverse direction, and means for enabling successive movements of the operating handle in said one direction and in said reverse direction to be effected with the application of a relatively uniform amount of force to the handle although the force of said spring increases as the wheel is rotated.

6. In an electric circuit breaker: a pair of separable switch contacts; means comprising a movable switch arm for moving one of the switch contacts from an open circuit position to a closed circuit position; stored energy actuating means, including a spring, operatively coupled to the switch arm for moving said arm in response to discharge of the actuating means; and means for charging the stored energy actuating means comprising a rotatable ratchet wheel connected to said spring to stress the spring upon rotation of the wheel, the wheel having two sets of peripheral teeth disposed a plurality of different distances from the axis of wheel rotation, a pair of reciprocating pawls disposed to engage the two sets of teeth, respectively, and a manual handle operatively connected to both of the pawls and supported for oscillatory movement between raised and lowered positions, said wheel being partially rotated by the action of one of the pawls upon movement of the handle from its raised position to its lowered position and being further rotated by the action of the other pawl upon subsequent movement of the handle from its lowered position to its raised position, the distances between the respective teeth of said two sets of teeth and the axis of wheel rotation being so selected that the force needed to move the operating handle from lowered to raised positions is no greater than the force needed to move the handle from raised to lowered position.

7. In an electric circuit breaker: a pair of separable switch contacts; switch means for moving one of the switch contacts from an open circuit position to a closed circuit position; stored energy closing means, including a spring, operatively coupled to the switch means for actuating the same upon discharge of said spring; and charging means for stressing said spring comprising a rotatable ratchet wheel connected to the spring and biased thereby to a first angular position, the ratchet wheel having a plurality of peripheral teeth spaced thereon at different predetermined distances from its axis of rotation, a manually operable oscillatory handle, at least one reciprocating pawl disposed to engage predetermined peripheral teeth of the ratchet wheel, the pawl being connected to the handle and operated thereby to drive the wheel in a predetermined direction from its first position to a second angular position approximately 180 degrees therefrom, said spring being stressed and closing energy being accumulated therein in response to the rotation of the ratchet wheel to its second position and said wheel being rotated further in said predetermined direction and returned to its first position in response to discharge of the closing energy stored in the spring, and blocking means associated with the ratchet wheel independently of its peripheral teeth and of said pawl to prevent rotation of the wheel from its first position in a direction opposite to said predetermined direction.

8. In an electric circuit breaker: a pair of separable switch contacts; means comprising a movable switch arm for moving one of the switch contacts from an open circuit position to a closed circuit position; and actuating means for the switch arm comprising a double-pawl ratchet mechanism including a ratchet wheel having an eccentric output element, means for interconnecting said element and said arm, a pair of reciprocating pawls mounted in driving engagement with said wheel, said pawls being arranged to rotate the wheel in a step-by-step manner upon alternate operation thereof, a manual operating handle mounted for oscillatory movement in a plane which is substantially perpendicular to the plane of movement of said switch arm, and means for connecting said handle to said pawls for alternately operating both of the pawls in turn during each oscillation of the handle.

9. In an electric circuit breaker: a pair of separable switch contacts; means comprising a movable switch arm for moving one of the switch contacts from an open circuit position to a closed circuit position; stored energy actuating means, including a spring, operatively coupled to the switch arm; and means comprising a multi-pawl ratchet mechanism for controlling the stored energy actuating means, said mechanism comprising a rotatable ratchet member having an eccentric output element connected to the spring to stress the spring upon rotation of the ratchet member from a first angular position to a predetermined dead-center position and to release the energy stored in the spring upon further rotation of the ratchet member beyond said dead-center position, a manual operating handle disposed for oscillatory movement in a plane which is substantially perpendicular to the plane in which said switch arm moves, and means including said handle and a plurality of driving pawls connected to the handle and engaging said ratchet member for advancing the ratchet member in a step-by-step manner from its first position to beyond said dead-center position upon repeated oscillatory operation of the handle.

10. In an electric circuit breaker: a pair of separable switch contacts; means for moving one of the switch contacts from an open circuit position to a closed circuit position; stored energy actuating means, including a spring; means for operatively coupling said actuating means to said means for moving said one switch contact; and charging means for the spring, said charging means comprising a manually operated oscillatory handle means for incrementally stressing the spring in response to successive strokes of said handle, and means for increasing the mechanical advantage of the charging means during the spring charging operation, whereby variations in the force needed to effect repeated oscillations of the handle in order to charge the spring are minor compared to the relative increase in stress of the spring.

References Cited in the file of this patent

UNITED STATES PATENTS

| | | |
|---|---|---|
| 2,269,858 | Obszarny | Jan. 13, 1942 |
| 2,397,790 | Kapusta | Apr. 2, 1946 |
| 2,644,053 | Lingal et al. | June 30, 1953 |
| 2,829,737 | Favre | Apr. 8, 1958 |
| 2,914,635 | Lester et al. | Nov. 24, 1959 |
| 2,937,258 | Starr | May 17, 1960 |
| 2,943,163 | Hay | June 28, 1960 |